Aug. 19, 1969  W. S. EGGERT, JR  3,461,819
VEHICLE BODY CONSTRUCTION AND METHOD OF MAKING IT
Filed Aug. 22, 1967  5 Sheets-Sheet 1
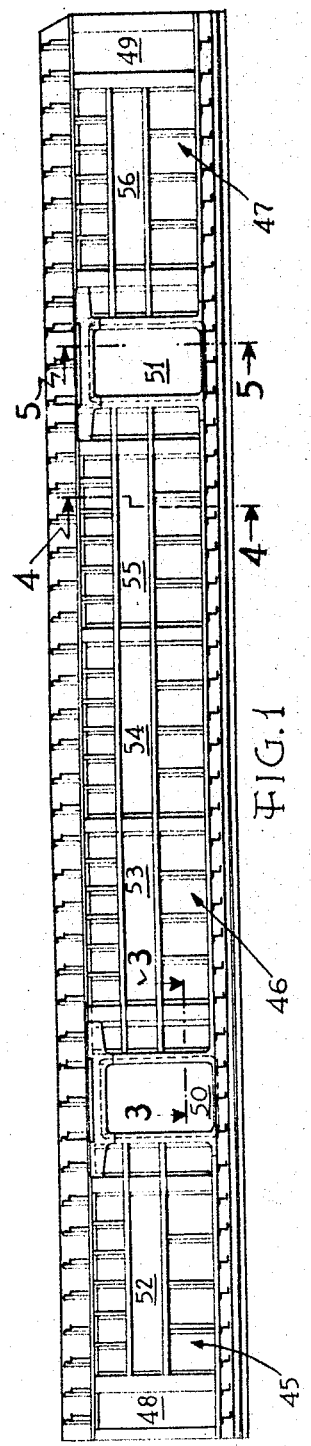
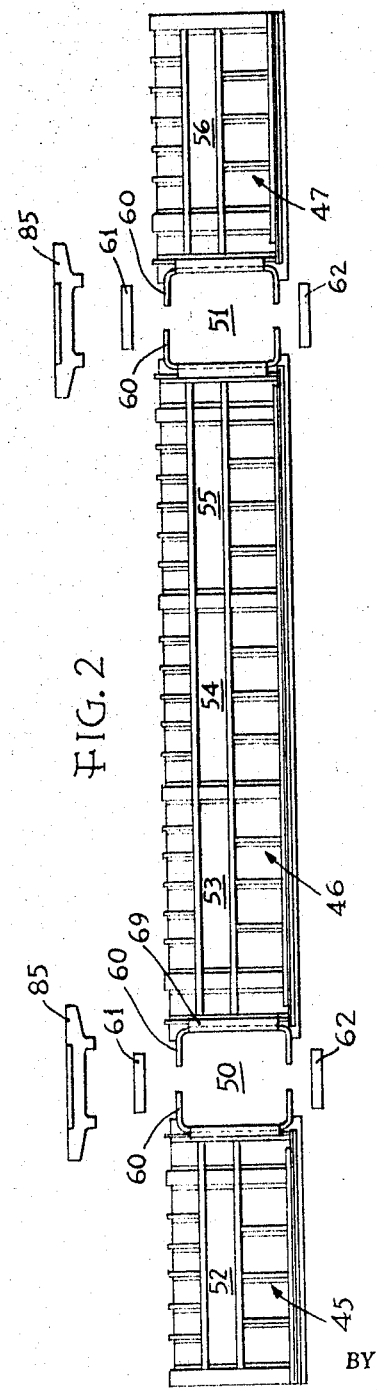
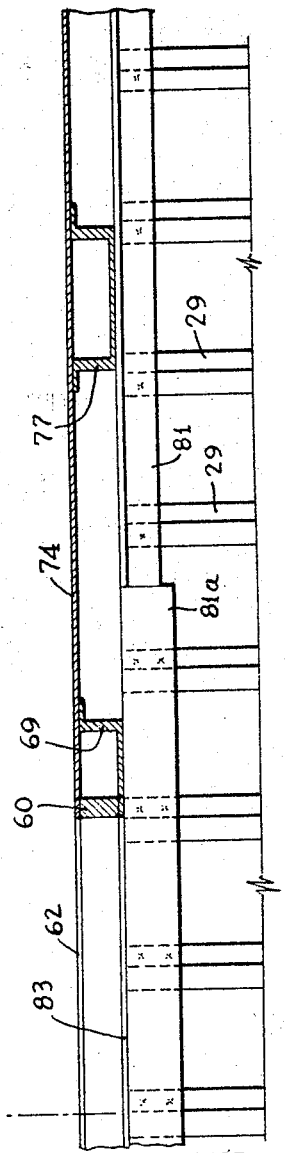
INVENTOR.
Walter S. Eggert, Jr.
BY
William R. Nolte
AGENT

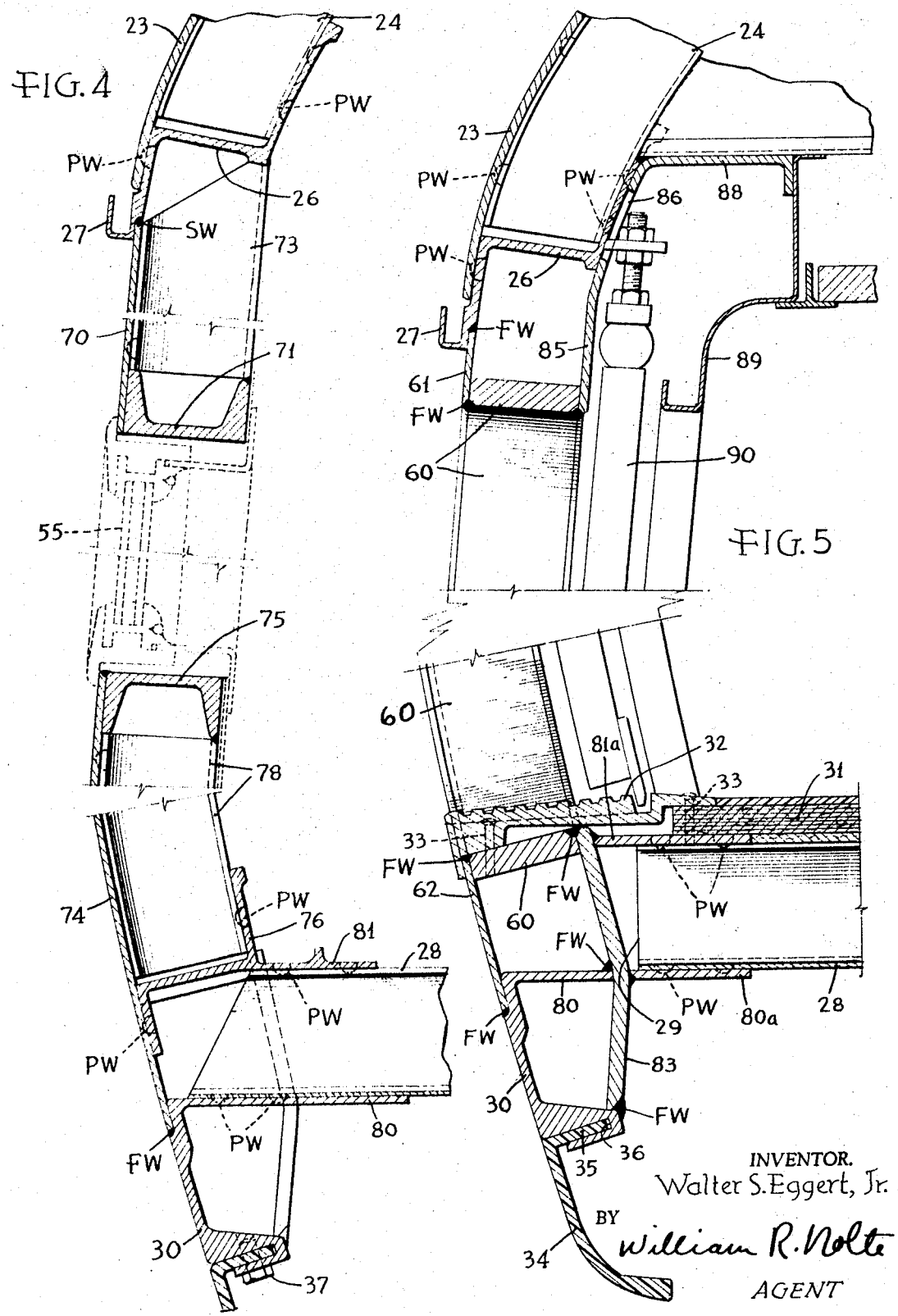

INVENTOR.
Walter S. Eggert, Jr.
BY
William R. Nolte
AGENT

Aug. 19, 1969   W. S. EGGERT, JR   3,461,819
VEHICLE BODY CONSTRUCTION AND METHOD OF MAKING IT
Filed Aug. 22, 1967   5 Sheets-Sheet 4

INVENTOR.
Walter S. Eggert, Jr.
BY
William R. Nolte
AGENT

INVENTOR.
Walter S. Eggert, Jr.
BY
William R. Nolte
AGENT

United States Patent Office 3,461,819
Patented Aug. 19, 1969

3,461,819
VEHICLE BODY CONSTRUCTION AND
METHOD OF MAKING IT
Walter S. Eggert, Jr., Huntingdon Valley, Philadelphia,
Pa., assignor to The Budd Company, Philadelphia, Pa.,
a corporation of Pennsylvania
Filed Aug. 22, 1967, Ser. No. 662,525
Int. Cl. B61d 17/00, 25/00; B23p 21/00
U.S. Cl. 105—401
2 Claims

ABSTRACT OF THE DISCLOSURE

A railway vehicle sidewall construction including upper and lower web sheets having a plurality of strut members and at least one full length longitudinal beam and a plurality of full length strut members secured thereto to form a panel unit. The method of construction includes forming doorway splicer units with interiorly offset horizontal flanges which connect lower through-running beam members of adjacent panels and embracing therewith the ends of short transverse floor beams in the doorway.

Background of the invention

Heretofore it has been most usual to make the sidewalls of railway passenger cars as full-height full-length unit-formed truss girders extending vertically from side sills to purlins and longitudinally from one end of the car to the other. See, for example, the U.S. patent to Dean 2,171,425, issued Aug. 29, 1939. A common characteristic of these unitary truss girder sidewall constructions has been the presence of vertical through-running struts extending from side sill to purlin and connected at various points along their height by short interposed longitudinal rail members, usually at window sill and header heights. Where windows are numerous and relatively narrow the vertically through-running strut construction is convenient. However, if very wide windows are desired, as contemplated herein, the vertically through-running strut and initially-unitized pre-assembled full-side-frame construction is not as convenient as desired.

Summary of the invention

The present invention provides a construction and method of assembly which are very convenient and economical for cars designed to have very wide windows and a plurality of intermediate side doors, although having distinct advantages for cars of other designs.

According to the present invention, a sidewall unit comprises a plurality of panels which are united at the doors, each panel comprising lower and upper longitudinal panel-through-running girder units which are united at the windows, and each girder unit comprising at least one longitudinal panel-through-running beam element, a plurality of longitudinally spaced short interposed vertical strut members, and a connecting web element, the web element here being formed by the car sheathing which, with light strong materials of large section, such as aluminum alloys, is relatively thick and rigid.

The lower and upper girder units are connected by window-height short interposed vertical strut members and at the end by vertical through-running full-length strut members which may form parti-door-frame parts to form unitary pre-assembled panel units and these panel units are united in the door frames, with splicers added, to form continuous sidewall units which are assembled with roof unit, floor or underframe unit, and end units to form the full car body enclosure.

An object of the invention is to provide a vehicle construction and method of assembly, especially suited for the use of light-weight large-section materials and particularly adapted for vehicles having plural intermediate side doors and wide windows, which provide maximum convenience, economy and strength.

Drawings

The above and other objects of the invention, as well as various features of novelty and advantages, will be apparent from the following description of an exemplary embodiment, reference being made to the accompanying drawings, wherein:

FIG. 1 is an inside elevation of a full sidewall unit, with parts of floor and roof units, of a railway passenger car of the rapid transit or subway type embodying the present invention;

FIG. 2 is an exploded view of the main sidewall parts shown in FIG. 1 before the side panels have been joined and door splicers installed;

FIG. 3 is a greatly enlarged partial horizontal section taken on the line 3—3 of FIG. 1, the section also being shown on FIG. 6;

FIG. 4 is a greatly enlarged partial vertical transverse inter-door section taken on the line 4—4 of FIG. 1;

FIG. 5 is a greatly enlarged partial vertical transverse intra-door section taken on the line 5—5 of FIG. 1;

Description of specific embodiment

Figure 6:
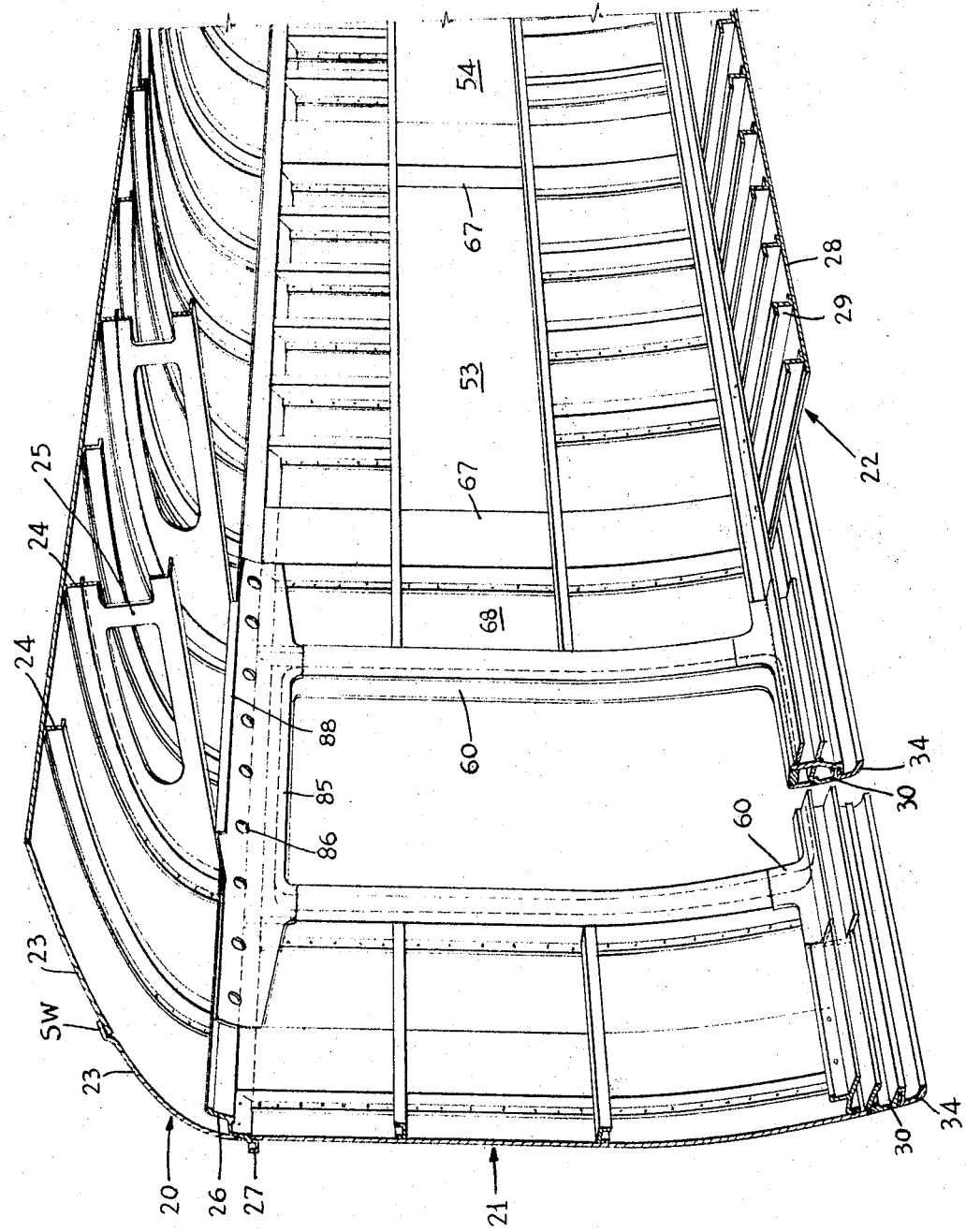
FIG. 6 is a partial enlarged perspective view, partly in section, of the interior of a car before the interior finish has been installed.

Referring first to FIG. 6, a full car enclosure comprises a roof assembly unit 20, a sidewall assembly unit 21 for each side, an underframe or floor assembly unit 22, and two endwall assembly units (not shown). The present invention is mainly concerned with the sidewall assembly unit 21, the roof and underframe units being shown to the extent required to reveal how the sidewall assembly unit is related to them since some components which are associated with them serve as sidewall components after final assembly.

The roof assembly unit 20 comprises sheathing 23, carlines 24, roof girders 25, and longitudinal car-through-running generally Z-shaped purlin 26, which includes a gutter 27.

The underframe or floor assembly unit 22 comprises a bottom web or pan sheet 28, transverse floor beams 29, and a longitudinal car-through-running channel-section sidesill element or component 30 on each side. At intervals there will be deeper cross-bearer girders (not shown) and at the ends there will be truck-carrying bolster structures (not shown). As shown at the bottom of FIG. 5, flooring 31 is secured to the tops of the floor beams 29; and in the doorways a tread plate or threshold plate 32 is secured, as by drive pins or screws 33. A bottom trim piece or skirt 34, which may be a substantial car-through-running beam-like member, is secured to the lower edge of the sidesill component 30, as by a flange 35 thereof inserted in a groove 36 of the sidesill component and removably held, as by screw bolts 37 shown in FIG. 4. The beams 29 and pan 28 may be secured to the wide top horizontal flange of the sidesill component 30, as by plug welds PW.

Those skilled in the art will know the best procedures for securing the various parts of the assembly together so no attempt will be made to explain in detail how the various connections are made. Since some welds are illustrated, they will be designated, where convenient, as PW for plug welds, SW for seam welds, and FW for fillet welds.

Referring to FIGS. 1 and 2, a sidewall assembly unit 21 comprises a plurality of main panel units 45, 46 and 47 (indicated as to length by lines between arrows in FIG. 1) between end doors 48, 49, the main side panel units extending from and being connected at the intermediate side doors 50, 51. The panel unit 45 provides framing for a wide window opening 52; the panel unit 46 provides like framing for wide window openings 53, 54, 55; and the panel unit 47 provides like framing for a wide window opening 56.

Each panel unit includes a C-shaped door frame member or element 60, these frame elements in final sidewall assembly being united by means including welded-in splicer members 61, 62 and others to be described later to form the full door frame and unite the sidewall panel units. As shown in FIGS. 4 and 5, the splicer members 61, 62 form part of the side sheathing at the doors.

Figure 9:
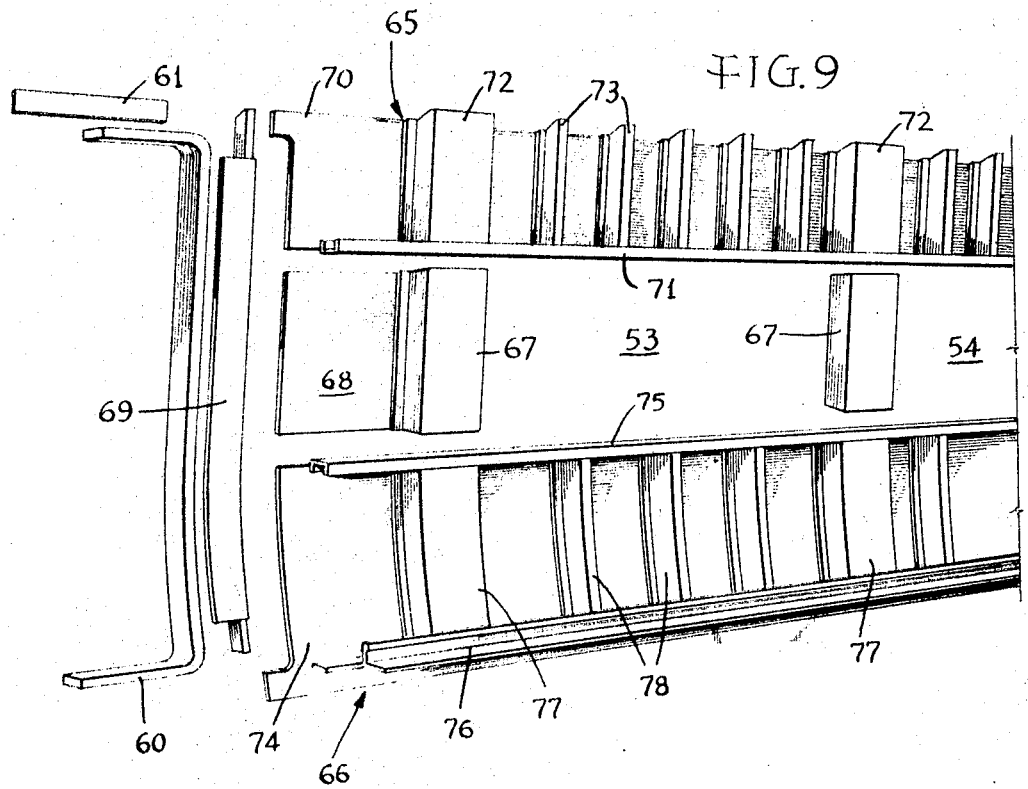
FIG. 9 is a partially exploded perspective view of a portion of a side panel unit.
Figure 10:
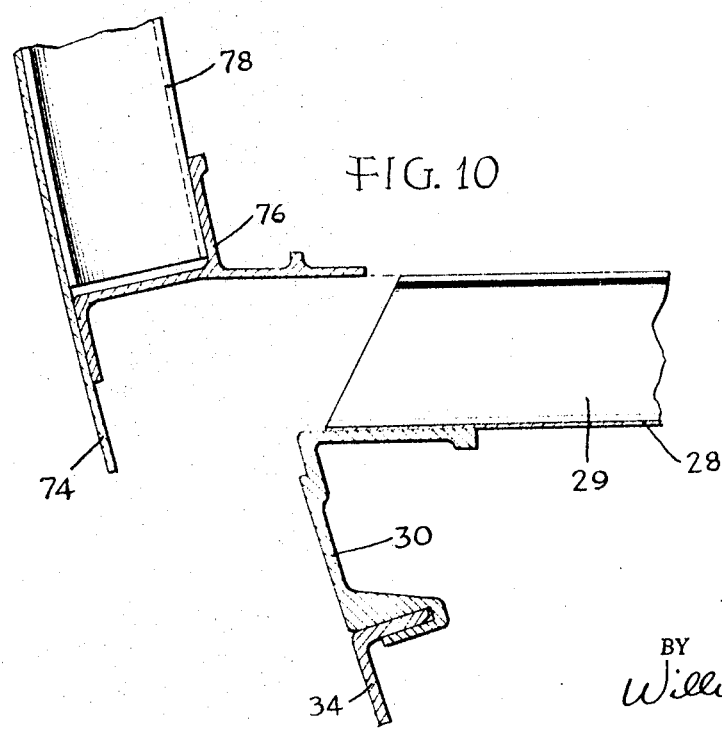
FIG. 10 is an exploded sectional view of parts shown at the bottom of FIG. 4.

As shown in FIG. 9, a side panel unit comprises an upper girder unit structure 65, a lower girder unit structure 66, short intermediate hat-section connecting strut members or elements 67, 68, with sheathing pieces where needed, and vertical panel-through-running end struts 69 at the doors. The C-shaped door frame elements 60 also constitute vertically through-running strut members at the ends of the panels.

The upper girder unit 65 comprises sheathing or web means 70, a panel-through-running longitudinal bottom rail or beam 71, here an upwardly open channel-section member forming a window top rail or header, main hat-shaped strut members or components 72 at window end locations (between or inter-window), and above-window (intra-window) strut components 73.

The lower girder unit 66 comprises sheathing 74, a longitudinal panel-through-running top rail or beam 75, here a downwardly open channel-section member forming a window bottom rail or sill, a longitudinal Z–V-section panel-through-running sidesill beam element 76, main inter-window hat-section strut members or elements 77 at window end locations, and below-window intra-window strut members or elements 78. The strut elements align with others of the other girder unit and with the girder-connecting struts.

At the doorways the wide thick C-shaped semi-door-frame members 60 are welded together and are also reinforced at the joints by splicer members, the outer sheathing splicers 61, 62 having already been described. At the bottom the width of the door frame 60 must be accommodated and this causes a displacement of the floor beam supporting means and a shortening of the floor beams.

The normal between-door or inter-door structure is shown at the bottom of FIG. 4, the ends of the floor beams 29 being supported on the wide top flange 80 of the sidesill component 30, which comprises part of the floor unit assembly, and supporting the interior lateral wide flange 81 of the Z–V beam element 76, which comprises part of the sidewall assembly unit.

Figure 7:
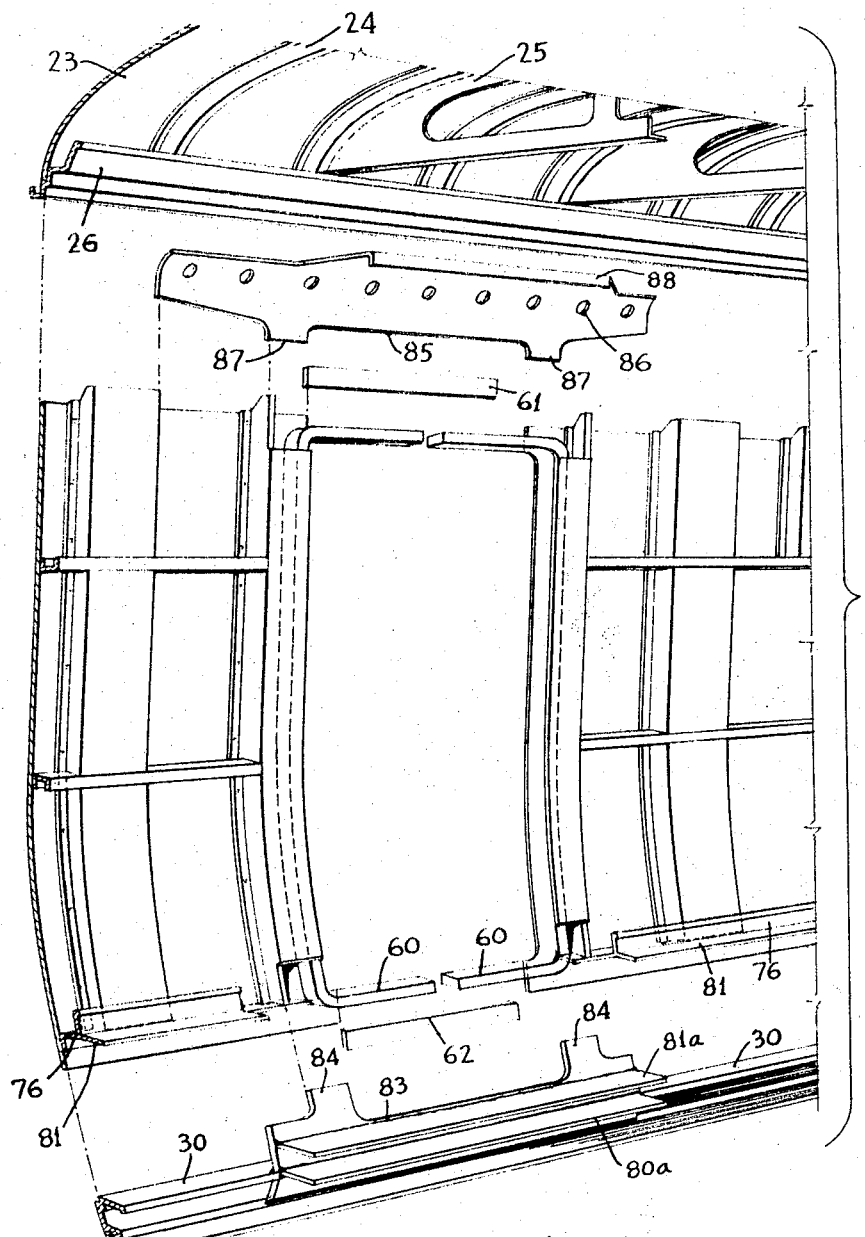
FIG. 7 is an exploded perspective view of the parts shown at the left side of FIG. 6.
Figure 8:
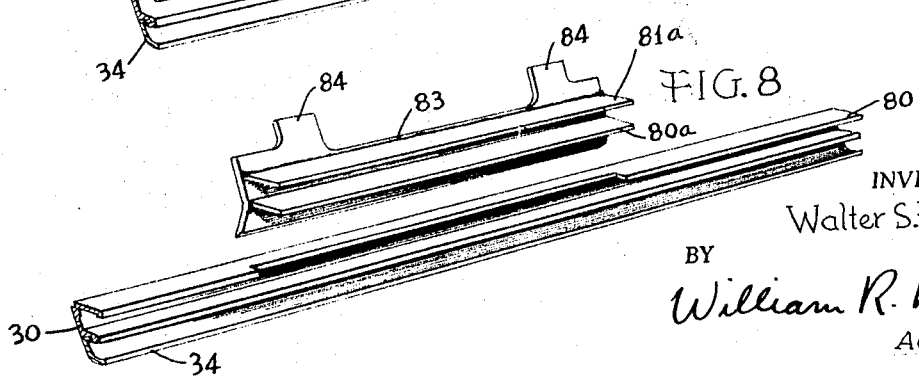
FIG. 8 is a further exploded perspective view of parts shown at the bottom of FIG. 7.

The in-door or intra-door structure is shown at the bottom of FIG. 5 and, in exploded view, in FIGS. 7 and 8. Here it is seen that in the door space, between the spaced ends of the Z–V beam elements 76, there is provided a lower interior door frame splicer unit 82 which comprises a thick generally vertical bent plate 83 which is welded to the door frame elements 60 and related parts, having upwardly extending spaced extensions 84 which are secured to the sides of the door frame. The upper flange 80 of the sidesill component 30 is partly cut away, as best shown in FIG. 8, to receive the plate 83 and an auxiliary flange extension 80a is secured, as by fillet welding FW, to the inner side of the splicer plate 83 to support the short floor beams 29 at the door. At a distance above the flange extension 80a there is secured to the splicer plate 83, as by fillet welding FW, a flange extension 81a which overlies the short floor beams 29 at the door. Although FIGS. 7 and 8 show the flange extension 81a as being secured to the plate 83 before the floor beams 29 are in place, it will be understood that it may be applied after the full floor and sidewall assembly units have been brought together.

Above the door opening there is provided an upper interior curved splicer plate 85 which, at final assembly procedure, is secured, as by suitable means such as welding, to the door frame parts and to the roof purlin 26. Large holes 86 are shown for making strong plug welds with the purlin 26. The plate 85 has spaced downwardly projecting extensions 87 for securement to the sides of the door frame. The plate 85 has an inwardly extending top flange 88 for partially supporting a casing 89 for a sliding door 90.

The method of assembly will largely be evident from the above description but, to review briefly, the upper and lower side girder units 65, 66 are first pre-assembled separately; then the girder units are connected by the intermediate inter-window short strut elements 68 and sheathing pieces where needed; then the long end struts 69 and the C-shaped door frame elements 60 are secured to the end or ends of the full-height side panel unit; then the side panel units are secured together at the doors to form a full sidewall assembly unit; then the roof unit, floor unit, end units, and sidewall units are secured together. Alternatively, the sidewall panel units can be brought separately into position with the floor and roof units and the sidewall panel units then secured together at final assembly operations.

The construction and method of assembly are particularly advantageous for very wide window design but, as stated, are also suitable and desirable if the design requires narrower windows. In the latter case the strut elements 73 and 78 could be replaced by larger strut elements like 72, 77 and completed by short strut elements like 67 in the space between upper and lower girder units.

The construction and method of assembly are also particularly suitable for light-weight large-section materials which provide sheating of sufficient rigidity and strength to utilize the girder and panel unit assemblies. The arrangement further permits the side assemblies to be made in smaller units, thus spreading the work between a greater number of stations and workmen; and also provides smaller sub-assemblies which are more easily handled.

It is especially helpful in providing door frames since the door frame elements are parts of the panel unit assemblies and largely require only to be connected to provide full door frames and permitting this door frame completion to be selectively performed at an early stage to create a full sidewall assembly unit or to be performed at final assembly procedure after the several side panel units have been separately brought into assembly relationship with the roof and floor assembly units.

It is thus seen that the invention provides a novel and advantageous as well as convenient and economical construction and method of assembly for a vehicle body enclosure having a number of intermediate side doors and wide windows, using light-weight large-section materials, such as aluminum alloys, which are readily obtainable in extruded or rolled form in a wide selection of cross-sectional shapes.

While one embodiment of the invention has been described for purposes of illustration, it is to be understood that there may be other embodiments and modifications within the general scope of the invention.

What is claimed is:

1. A vehicle sidewall construction adapted for assembly in a vehicle body having a roof unit, a floor or underframe unit, endwall units, and sidewall units, with purlins at the roof-to-sidewall joint and sidesills at the floor-to-sidewall joint, said sidewall construction comprising at least one pre-assembled sidewall panel unit formed of a plurality of pre-assembled longitudinal panel-through-running girder units at different elevations, each said girder unit comprising a plurality of short strut members, at least one panel-through-running longitudinal beam member, a unitizing web sheet, a plurality of strut members connecting said girder units to form the sidewall panel unit, one of said plurality of girder units including a lower girder unit which comprises longitudinal panel-through-running beam members at its upper and lower edges, the beam member at the lower edge of said lower girder unit comprising a part of the sidesill structure of the vehicle, said floor unit of said vehicle including another part of the sidesill structure with floor beams supported thereon and said one part of said sidewall unit lower beam member resting on said floor beams, said sidewall further including adjacent panel units united in an intermediate doorway, and in which an interior door frame splicer unit is provided to connect the lower beam members of adjacent panel units at the door, said splicer unit having interiorly offset vertically spaced horizontal flanges embracing the ends of short floor beams in the doorway, and a threshold tread plate secured above and to said splicer unit in the doorway.

2. The method of constructing a sidewall of a vehicle body having a floor unit with sidesills, a roof unit with purlins, endwall units, and sidewall units, which comprises, forming lower and upper sidewall panel girder units, each girder unit including a plurality of short strut members, at least one panel-through-running beam, and a unitizing sheet web which constitutes the outer sheathing of the vehicle, connecting the girder units by short strut and web members and at least one end vertical panel-through-running strut member, forming adjacent panels with facing C-shaped parti-door-frame members at the adjacent ends of the panels, joining the panel units thus formed to the roof unit at a purlin and the floor unit at a sidesill, joining the door frame members, and further connecting interior upper and lower splicer members to the door frame, with the lower interior splicer member forming an interiorly offset bridging structure for supporting the ends of shortened floor beams at the door.

References Cited

UNITED STATES PATENTS

| | | | |
|---|---|---|---|
| 2,267,702 | 12/1941 | Dean et al. | 105—397 X |
| 2,294,357 | 8/1942 | Dean et al. | 105—397 |
| 2,851,965 | 9/1958 | Leriche | 105—409 X |
| 3,102,498 | 9/1963 | Dean | 105—397 |
| 3,151,573 | 10/1964 | Eggert | 105—401 |
| 3,186,755 | 6/1965 | Ward | 296—28 |

DRAYTON E. HOFFMAN, Primary Examiner

U.S. Cl. X.R.

29—469